(12) United States Patent
Liu et al.

(10) Patent No.: US 7,337,115 B2
(45) Date of Patent: Feb. 26, 2008

(54) SYSTEMS AND METHODS FOR PROVIDING ACOUSTIC CLASSIFICATION

(75) Inventors: Dabien Liu, Belmont, MA (US); Francis G. Kubala, Boston, MA (US)

(73) Assignees: Verizon Corporate Services Group Inc., Basking Ridge, NJ (US); BBN Technologies Corp., Cambridge, MA (US)

( * ) Notice: Subject to any disclaimer, the term of this patent is extended or adjusted under 35 U.S.C. 154(b) by 1014 days.

(21) Appl. No.: 10/611,106

(22) Filed: Jul. 2, 2003

(65) Prior Publication Data

US 2004/0030550 A1 Feb. 12, 2004

Related U.S. Application Data

(60) Provisional application No. 60/419,214, filed on Oct. 17, 2002, provisional application No. 60/394,064, filed on Jul. 3, 2002, provisional application No. 60/394,082, filed on Jul. 3, 2002.

(51) Int. Cl.
*G10L 17/00* (2006.01)
(52) U.S. Cl. .................. 704/246; 704/231; 704/243
(58) Field of Classification Search ............... 704/246, 704/243, 235, 260, 245, 231
See application file for complete search history.

(56) References Cited

U.S. PATENT DOCUMENTS

| | | | |
|---|---|---|---|
| 5,638,487 A * | 6/1997 | Chigier | 704/253 |
| 5,897,614 A * | 4/1999 | McKiel, Jr. | 704/208 |
| 6,208,967 B1 * | 3/2001 | Pauws et al. | 704/256.8 |
| 6,243,680 B1 * | 6/2001 | Gupta et al. | 704/260 |
| 6,618,702 B1 * | 9/2003 | Kohler et al. | 704/250 |
| 6,895,376 B2 * | 5/2005 | Perronnin et al. | 704/250 |

OTHER PUBLICATIONS

Liu et al., ("Fast Speaker Change Detection for Broadcast News transcription and Indexing," The Proceedings of Eurospeech 1999, Budapest, Hungary, 4 pages).*
Scott S. Chen et al.: "Speaker, Environment and Channel Change Detection and Clustering via the Bayesian Information Criterion," in DARPA Speech Recognition Workshop, 1998, 6 pages.
Marti A. Hearst: "Multi-Paragraph Segmentation of Expository Text," in Proceedings of the 2nd Annual Meeting of the Association for Computational Linguistics, New Mexico State University, Las Cruces, NM, 1994, pp. 1-8.
Amit Srivastava et al.: "Sentence Boundary Detection in Arabic Speech," 8th European Conference on Speech Communication and Technology, Sep. 1-4, 2003 in Geneva, Switzerland; 4 pages.

(Continued)

*Primary Examiner*—Vijay B Chawan

(57) ABSTRACT

A speech recognition system receives an audio signal and detects various features of the audio signal. For example, the system classifies the audio signal into speech and non-speech portions, genders of speakers corresponding to the speech portions, and channel bandwidths used by the speakers. The system detects speaker turns based on changes in the speakers and assigns labels to the speaker turns. The system verifies the genders of the speakers and the channel bandwidths used by the speakers and identifies one or more languages associated with the audio signal. The system recognizes the speech portions of the audio signal based on the various features of the audio signal.

37 Claims, 6 Drawing Sheets

OTHER PUBLICATIONS

Sreenivasa Sista et al.: "Unsupervised Topic Discovery Applied To Segmentation Of News Transcriptions," *8th European Conference on Speech Communication and Technology*, Sep. 1-4, 2003 in Geneva. Switzerland; 4 pages.

Daben Liu et al.: "Online Speaker Clustering," *ICASSP 2003*, vol. I, pp. 572-575, 2003 Hong Kong.

J. Billa et al.: "Audio Indexing Of Arabic Broadcast News," *ICASSP 2002*; Orlando, FL; May 13-17, 2002; 4 pages.

Scott Shepard et al.: "Oasis Translator's Aide," *Human Language Technology Conference*; San Diego, California; 2002; 2 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," *The Proceedings of Eurospeech*, Denmark, 2001; 6 pages.

Ji-Hwan Kim et al.: "The Use Of Prosody In A Combined System For Punctuation Generation And Speech Recognition," *The Proceedings of Eurospeech*, Denmark, 2001; 4 pages.

Jing Huang et al.: "Maximum Entropy Model For Punctuation Annotation From Speech," *The Proceedings of Eurospeech*, Denmark, 2001; pp. 917-920.

Yoshihiko Gotoh et al.: "Sentence Boundary Detection in Broadcast Speech Transcripts," *Proceedings of the International Speech Communication Association Workshop: Automatic Speech Recognition: Challenges for the New Millennium*, Paris, Sep. 2000; 8 pages.

John Makhoul et al.: "Speech and Language Technologies for Audio Indexing and Retrieval," *Proceedings of the IEEE*, vol. 88, No. 8, Aug. 2000; pp. 1338-1353.

Francis Kubala et al.: "Integrated Technologies For Indexing Spoken Language," *Communications of the ACM*, vol. 43, No. 2, Feb. 2000; pp. 48-56.

Sean Colbath et al.: "Spoken Documents: Creating Searchable Archives from Continuous Audio," *Proceedings of the 33rd Hawaii International Conference on System Sciences-2000*; pp. 1-9.

Francis Kubala et al.: "Situation Awareness Contexts for Smart Environments," *Inter-Agency Workshop on Research Issues for Smart Environments*; Atlanta, GA; 2000; 3 pages.

Daben Liu et al.: "Fast Speaker Change Detection For Broadcast News Transcription And Indexing," *The Proceedings of Eurospeech 1999*; Budapest, Hungary; 4 pages.

Daniel M. Bikel et al.: "An Algorithm that Learns What's in a Name," *Machine Learning*, 1999; pp. 1-20.

Richard Schwartz et al.: "Accurate Near-Real-Time Recognition of Broadcast News using Multiple-Pass Search Techniques," *1999 Workshop on Automatic Speech Recognition and Understanding*, Dec. 12-15, 1999; Keystone, Colorado; 6 pages.

Francis Kubala et al.: "Smart Information Spaces: Managing Personal and Collaborative Histories," *Proceedings of the 1998 DARPA/NIST Smart Spaces Workshop*, Jul. 30-31, 1998; 6 pages.

Daben Liu et al.: "Improvements in Spontaneous Speech Recognition," *Proceedings of the DARPA Broadcast News Transcription and Understanding Workshop*; Feb. 8-11, 1998 in Lansdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," *ICFEM*, Chantilly, Virginia; Feb. 1997; 4 pages.

Sean Colbath et al.: "OnTAP: Mixed-media Multi-lingual Language Processing," *Human Language Technology Conference*, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008.

* cited by examiner

SYSTEMS AND METHODS FOR PROVIDING ACOUSTIC CLASSIFICATION

RELATED APPLICATION

This application claims priority under 35 U.S.C. § 119 based on U.S. Provisional Application Nos. 60/394,064 and 60/394,082, filed Jul. 3, 2002, and Provisional Application No. 60/419,214, filed Oct. 17, 2002, the disclosures of which are incorporated herein by reference.

GOVERNMENT CONTRACT

The U.S. Government may have a paid-up license in this invention and the right in limited circumstances to require the patent owner to license others on reasonable terms as provided for by the terms of Contract No. N66001-00-C-8008 awarded by the Defense Advanced Research Projects Agency.

BACKGROUND OF THE INVENTION

1. Field of the Invention

The present invention relates generally to speech recognition and, more particularly, to systems and methods for improving speech recognition results by detecting features in an audio signal and using these features to improve the accuracy of word recognition by a speech recognition system.

2. Description of Related Art

Speech has not traditionally been valued as an archival information source. As effective as the spoken word is for communicating, archiving spoken segments in a useful and easily retrievable manner has long been a difficult proposition. Although the act of recording audio is not difficult, automatically transcribing and indexing speech in an intelligent and useful manner can be difficult.

Speech is typically received into a speech recognition system as a continuous stream of words. In order to effectively use the speech in information management systems (e.g., information retrieval, natural language processing, real-time alerting), the speech recognition system initially transcribes the speech to generate a textual document.

A problem with conventional speech recognition systems is that the accuracy of the word recognition results is greatly affected by the variability in the audio signal. For example, channel bandwidth, environment (e.g., background noise), speaker, speaking style, and language can all change unpredictably. Creating a single model to detect all of these variables would be extremely difficult.

Typically, conventional systems create separate models to detect channel bandwidth (i.e., whether the channel is a narrowband or wideband channel) and gender (i.e., whether the speaker is a male or female). These systems exploit these audio features to improve the accuracy of the word recognition results.

In speech recognition, accuracy is paramount. Accordingly, it is desirable to even further improve the accuracy of a speech recognition system.

SUMMARY OF THE INVENTION

Systems and methods consistent with the present invention provide an audio classifier that classifies a continuous stream of audio based on different features in the audio stream that may then be used by a speech recognition system to improve its word recognition results.

In one aspect consistent with the principles of the invention, a speech recognition system receives an audio signal and detects various features of the audio signal. For example, the system classifies the audio signal into speech and non-speech portions, genders of speakers corresponding to the speech portions, and channel bandwidths used by the speakers. The system detects speaker turns based on changes in the speakers and assigns labels to the speaker turns. The system verifies the genders of the speakers and the channel bandwidths used by the speakers and identifies one or more languages associated with the audio signal. The system recognizes the speech portions of the audio signal based on the various features of the audio signal.

In another aspect of the invention, a method of recognizing speech in an audio signal is provided. The method includes receiving an audio signal; detecting audio features from the audio signal by generating a phone-class sequence relating to the audio signal and processing the phone-class sequence to cluster speakers together, identify known ones of the speakers, and identify language associated with the audio signal; and recognizing speech in the audio signal using the audio features.

In a further aspect of the invention, an audio classifier is provided. The audio classifier includes speech event classification logic, speaker change detection logic, speaker clustering logic, bandwidth refinement logic, gender refinement logic, and language identification logic. The speech event classification logic is configured to receive an audio stream, classify the audio stream into speech and non-speech portions, identify genders of speakers corresponding to the speech portions, and identify channel bandwidths used by the speakers. The speaker change detection logic is configured to identify speaker turns based on changes in the speakers. The speaker clustering logic is configured to generate labels for the speaker turns. The bandwidth refinement logic is configured to refine the identification of channel bandwidths by the speech event classification logic. The gender refinement logic is configured to refine the identification of genders by the speech event classification logic. The language identification logic is configured to identify one or more languages associated with the audio stream.

In yet another aspect of the invention, a speech recognition system is provided. The system includes audio classification logic and speech recognition logic. The audio classification logic is configured to receive an audio signal and identify speech and non-speech portions of the audio signal. The audio classification logic is further configured to determine speaker turns based on the speech and non-speech portions of the audio signal and determine one or more languages associated with the speaker turns. The speech recognition logic is configured to recognize the speech portions of the audio signal based on the speaker turns and the one or more languages.

In another aspect of the invention, a speech recognition system is provided. The system includes audio classification logic and speech recognition logic. The audio classification logic is configured to receive an audio signal, identify speech and non-speech portions of the audio signal, and determine speaker turns based on the speech and non-speech portions of the audio signal. The audio classification logic is further configured to assign labels to the speaker turns and identify known speakers associated with the speaker turns. The speech recognition logic is configured to recognize the speech portions of the audio signal based on the speaker turns, the labels, and the known speakers.

In a further aspect of the invention, a method for recognizing speech is provided. The method includes receiving an audio signal containing speech; determining genders of speakers associated with the speech; determining channel bandwidths used by the speakers; identifying speaker turns based on changes in the speakers; refining the determination of genders by selecting a majority one of the genders when more than one of the genders was associated with one of the speaker turns; and refining the determination of channel bandwidths by selecting a majority one of the channel bandwidths when more than one of the channel bandwidths was associated with one of the speaker turns.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the present invention provide an audio classifier that classifies a continuous stream of audio based on different features present in the audio stream. The audio classifier may then use different models to detect the audio features with high confidence. The audio classifier may take advantage of the relationship among certain audio features to facilitate the detection of these features. The audio features may then be used by a speech recognition system to improve its word recognition results.

Exemplary System

Figure 1:
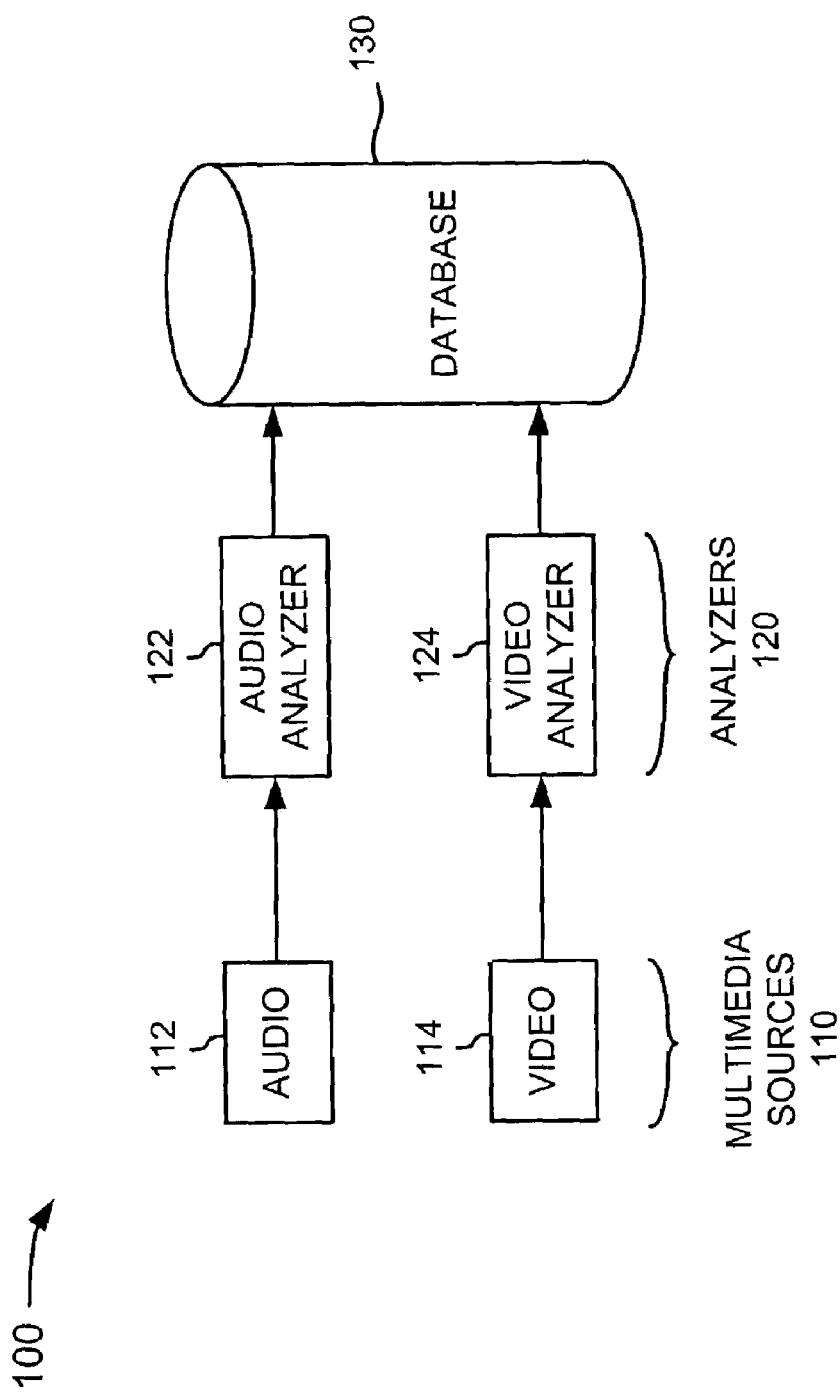
FIG. 1 is a diagram of a system in which systems and methods consistent with the present invention may be implemented.

FIG. 1 is a diagram of an exemplary system 100 in which systems and methods consistent with the present invention may be implemented. System 100 may include multimedia sources 110, analyzers 120, and a database 130. Database 130 may include a conventional database, such as a relational database, that stores information from analyzers 120. The various connections shown in FIG. 1 may be made via wired, wireless, and/or optical connections.

Figure 2:
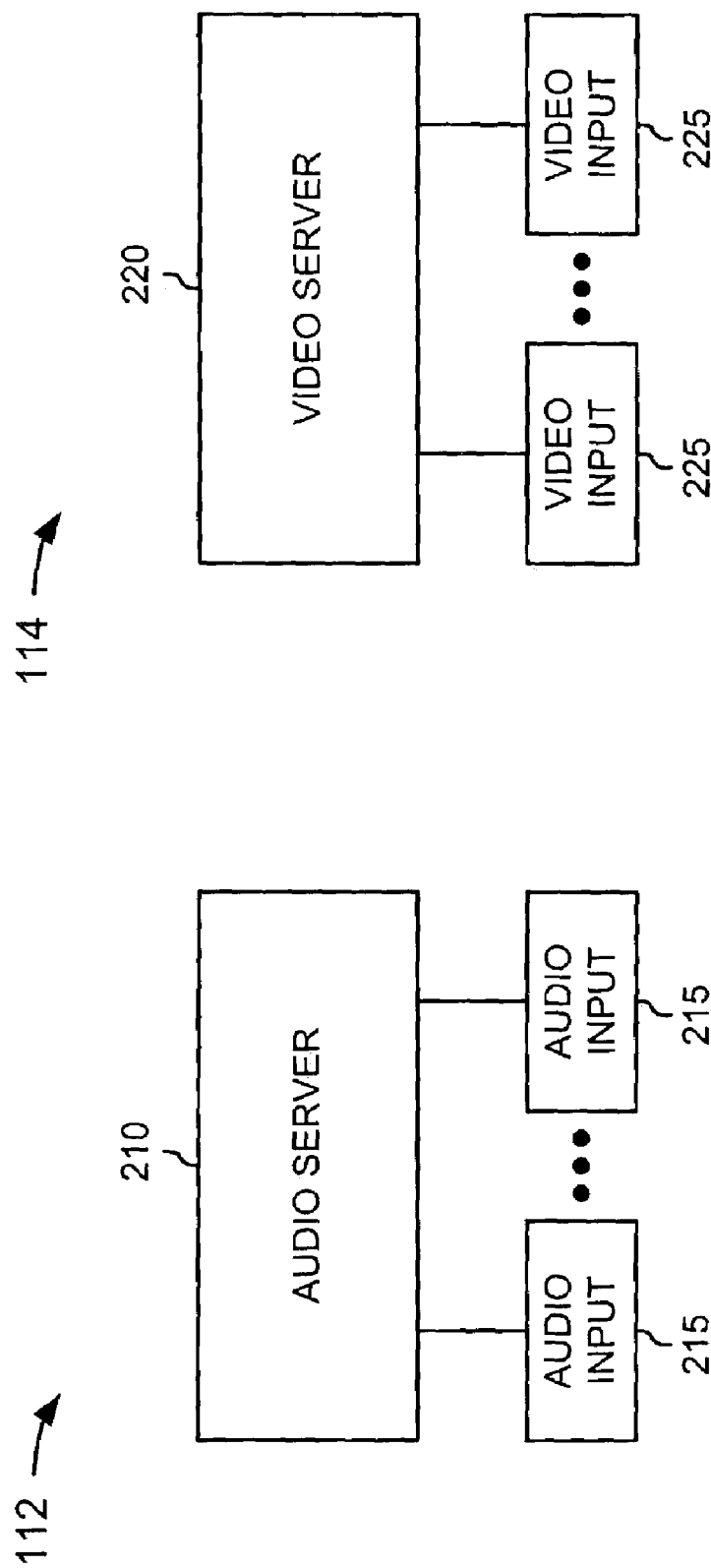
FIGS. 2A and 2B are exemplary diagrams of the multimedia sources of FIG. 1 according to an implementation consistent with the principles of the invention.

Multimedia sources 110 may include audio sources 112 and video sources 114. FIGS. 2A and 2B are exemplary diagrams of audio sources 112 and video sources 114, respectively, according to an implementation consistent with the principles of the invention.

FIG. 2A illustrates an audio source 112. In practice, there may be multiple audio sources 112. Audio source 112 may include an audio server 210 and one or more audio inputs 215. Audio input 215 may include mechanisms for capturing any source of audio data, such as radio, telephone, and conversations, in any language. There may be a separate audio input 215 for each source of audio. For example, one audio input 215 may be dedicated to capturing radio signals; another audio input 215 may be dedicated to capturing conversations from a conference; and yet another audio input 215 may be dedicated to capturing telephone conversations. Audio server 210 may process the audio data, as necessary, and provide the audio data, as an audio stream, to analyzers 120. Audio server 210 may also store the audio data.

FIG. 2B illustrates a video source 114. In practice, there may be multiple video sources 114. Video source 114 may include a video server 220 and one or more video inputs 225. Video input 225 may include mechanisms for capturing any source of video data, with possibly integrated audio data in any language, such as television, satellite, and a camcorder. There may be a separate video input 225 for each source of video. For example, one video input 225 may be dedicated to capturing television signals; another video input 225 may be dedicated to capturing a video conference; and yet another video input 225 may be dedicated to capturing video streams on the Internet. Video server 220 may process the video data, as necessary, and provide the video data, as a video stream, to analyzers 120. Video server 220 may also store the video data.

Returning to FIG. 1, analyzers 120 may include one or more audio analyzers 122 and one or more video analyzers 124. Each of analyzers 122 and 124 may include mechanisms that receive audio data (also video with embedded audio data) from multimedia sources 110, process the audio data, recognize the speech from the audio data, and store the speech recognition results in database 130.

Figure 3:
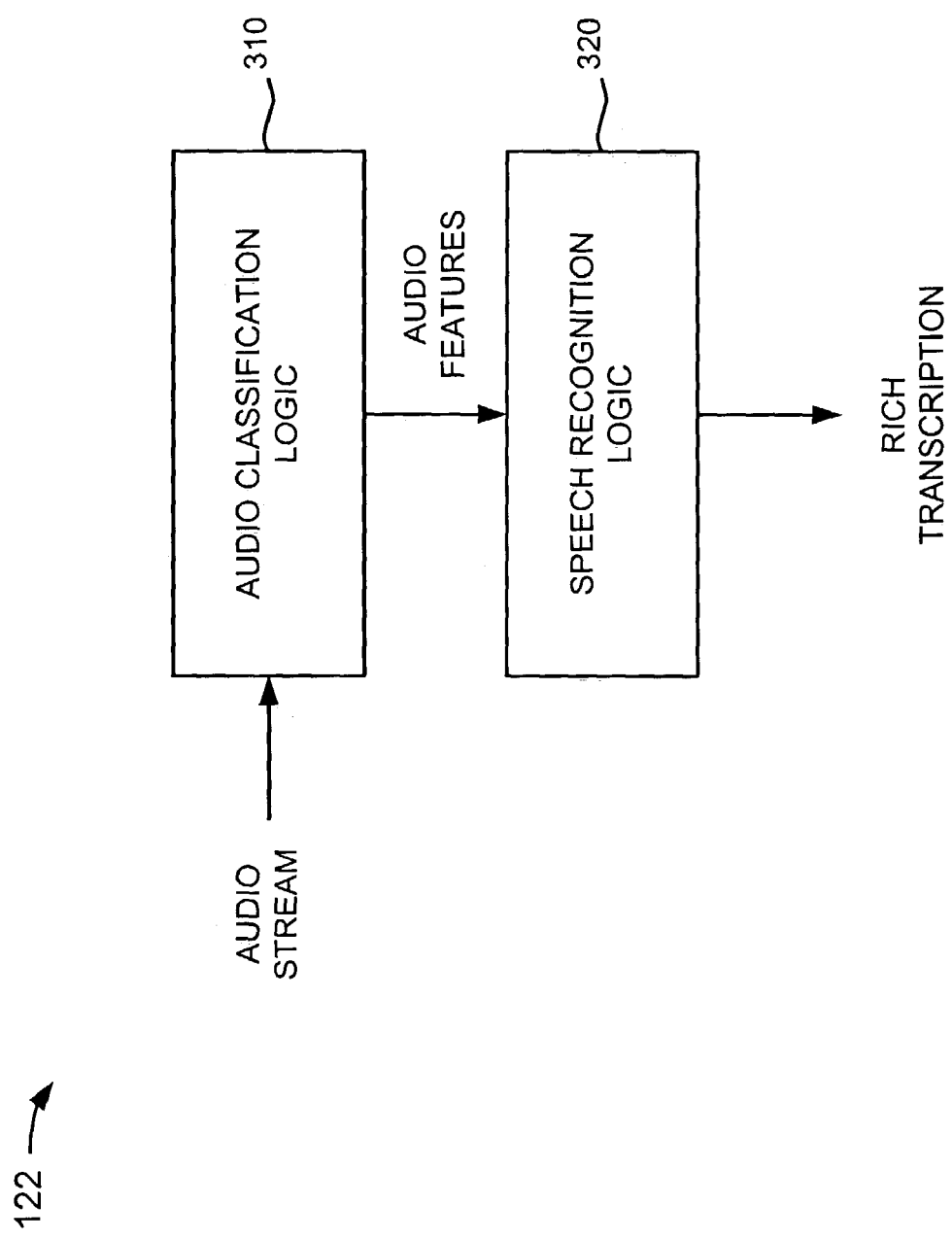
FIG. 3 is an exemplary diagram of the audio analyzer of FIG. 1 according to an implementation consistent with the principles of the invention.

FIG. 3 is an exemplary diagram of audio analyzer 122 according to an implementation consistent with the principles of the invention. Video analyzer 124 may be similarly configured. Video analyzer 124 may include, however, additional and/or alternate components particular to the media type involved.

Audio analyzer 122 may include audio classification logic 310 and speech recognition logic 320. Audio analyzer 122 may receive a continuous audio stream and classify the audio into features or classes. For each of the features or classes, audio classification logic 310 may use different models to detect the features with high confidence. The particular features detected by audio analyzer 122 will be described later. Audio classification logic 310 may send the audio stream with the detected features labeled to speech recognition logic 320.

Speech recognition logic 320 may perform continuous speech recognition to recognize the words spoken in the audio stream that it receives from audio classification logic 310. Speech recognition logic 320 may use known speech recognition techniques to generate a rich transcription of the speech using the features detected by audio classification logic 310. Speech recognition logic 320 may store its speech recognition results in database 130.

Audio Classification Logic

Generally, audio classification logic 310 automatically segregates an audio stream into homogeneous segments, or utterance blocks, that have specific acoustic and/or linguistic characteristics. Audio classification logic 310 may use a hierarchical process to segment the audio stream. The bottom layer may include phones, which are the minimum units of the audio stream. The phones can include speech phonemes (e.g., [a], [e], [l]), broad phone classes (e.g., vowels, consonants), or non-speech events (e.g., silence, music, applause, laugher, coughing, lip smack).

The second layer may include speaker turns. A speaker turn is a homogenous block that consists of multiple blocks from the lower layers. The third layer may include audio channel classifications, such as wideband and narrowband channel classifications. A wideband or narrowband channel may include one or more speaker turns. The top layer may include language identifiers that identify the language of the speech in the audio stream. A language identifier may include one or more channels and/or one or more speaker turns.

Audio classification logic 310 may segment the continuous audio stream into homogenous blocks in all layers. Audio classification logic 310 may concurrently detect several acoustic features, such as speech/non-speech, gender, and channel bandwidth. Audio classification logic 310 may also take advantage of the interrelationship between different features. For example, audio classification logic 310 may use phone-class transcripts to determine the language identifier and the phone boundaries for speaker boundary detection. Audio classification logic 310 may discard non-speech events for recognition efficiency by speech recognition logic 320.

Figure 4:
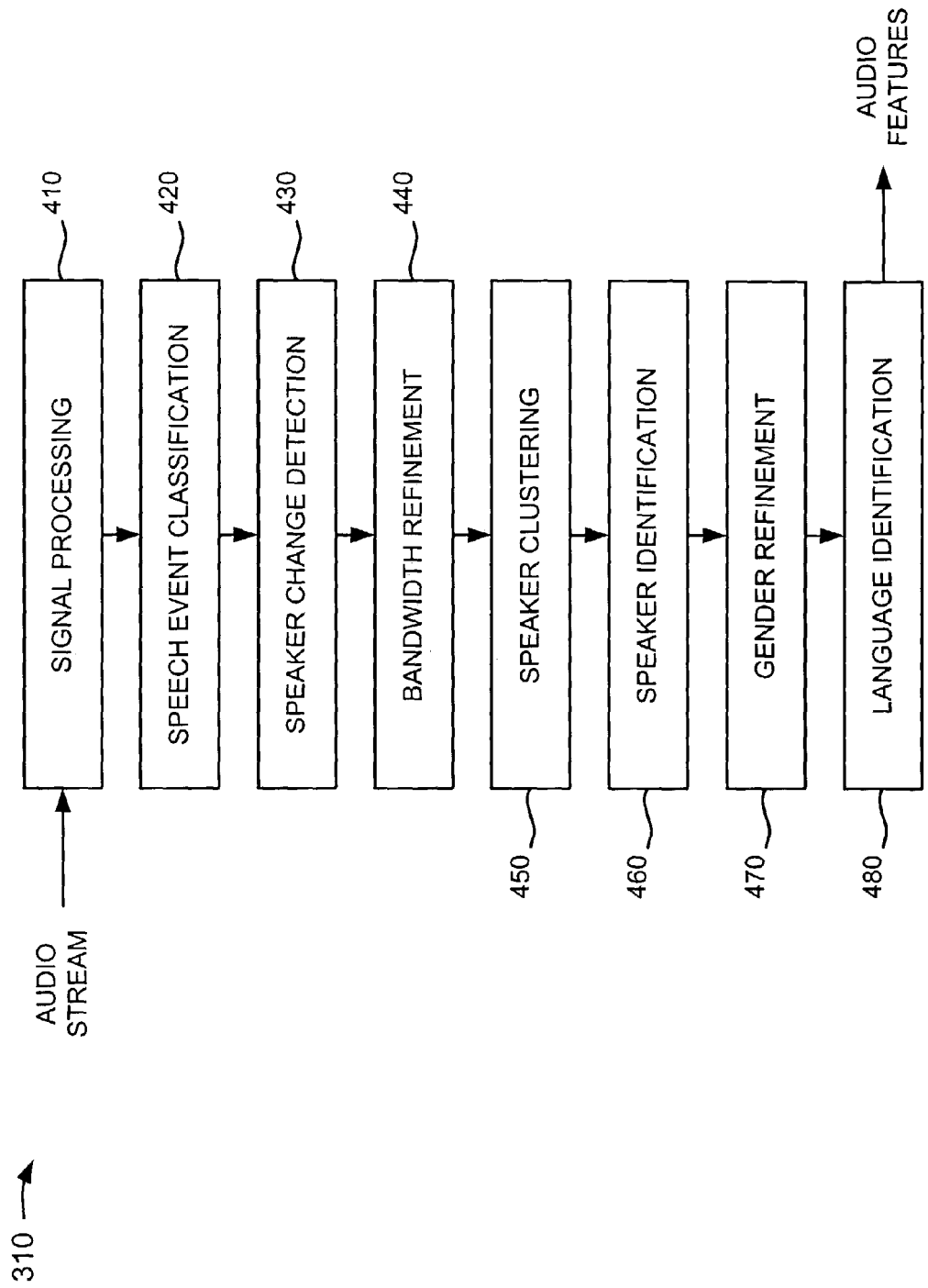
FIG. 4 is an exemplary diagram of the audio classification logic of FIG. 3 according to an implementation consistent with the principles of the invention.

FIG. 4 is an exemplary diagram of audio classification logic 310 according to an implementation consistent with the principles of the invention. Audio classification logic 310 may include signal processing logic 410, speech event classification logic 420, speaker change detection logic 430, bandwidth refinement logic 440, speaker clustering logic 450, speaker identification logic 460, gender refinement logic 470, and language identification logic 480. In other implementations, audio classification logic 310 contains more, fewer, or different elements. Also, while FIG. 4 shows certain elements as operating upon the results of other elements, some of the elements may perform their operations in parallel or in a different order.

Signal processing logic 410 may detect cepstrals, pitch, and formants with regard to the audio stream. Signal processing logic 410 may also detect zero-crossings (i.e., where the audio signal crosses 0 dB), signal energies, and signal encoding with regard to the audio stream. Signal processing logic 410 may use conventional techniques to detect these features of the audio stream. Signal processing logic 410 may provide the detected features to speech event classification logic 420.

Speech event classification logic 420 may use the information from signal processing logic 410 to detect speech/non-speech events, channel bandwidth, and gender. Speech events may include vowels, fricatives, and obstruents. Non-speech events may include silence, music, laughter, applause, and lip smack. Channel bandwidth may include wideband and narrowband channels. The gender may, of course, include male and female.

Speech event classification logic 420 may use a phone-class decoding technique, such as the one described in Daben Liu et al., "Fast Speaker Change Detection for Broadcast News Transcription and Indexing," Proceedings of Eurospeech 99, Budapest, Hungary, September 1999, pp. 1031-1034, which is incorporated herein by reference. In this case, speech event classification logic 420 may use the phone classes given in Table 1.

TABLE 1

| CLASS | SPEECH/NON-SPEECH |
|---|---|
| male-wideband-vowel (MWV) | speech |
| male-wideband-fricative (MWF) | speech |
| male-wideband-obstruent (MWO) | speech |
| male-narrowband-vowel (MNV) | speech |
| male-narrowband-fricative (MNF) | speech |
| male-narrowband-obstruent (MNO) | speech |
| female-wideband-vowel (FWV) | speech |
| female-wideband-fricative (FWF) | speech |
| female-wideband-obstruent (FWO) | speech |
| female-narrowband-vowel (FNV) | speech |
| female-narrowband-fricative (FNF) | speech |
| female-narrowband-obstruent (FNO) | speech |
| silence (SIL) | non-speech |
| music (MU) | non-speech |
| laughter (L) | non-speech |
| applause (AP) | non-speech |
| lip smack (LIP) | non-speech |

Figure 5:
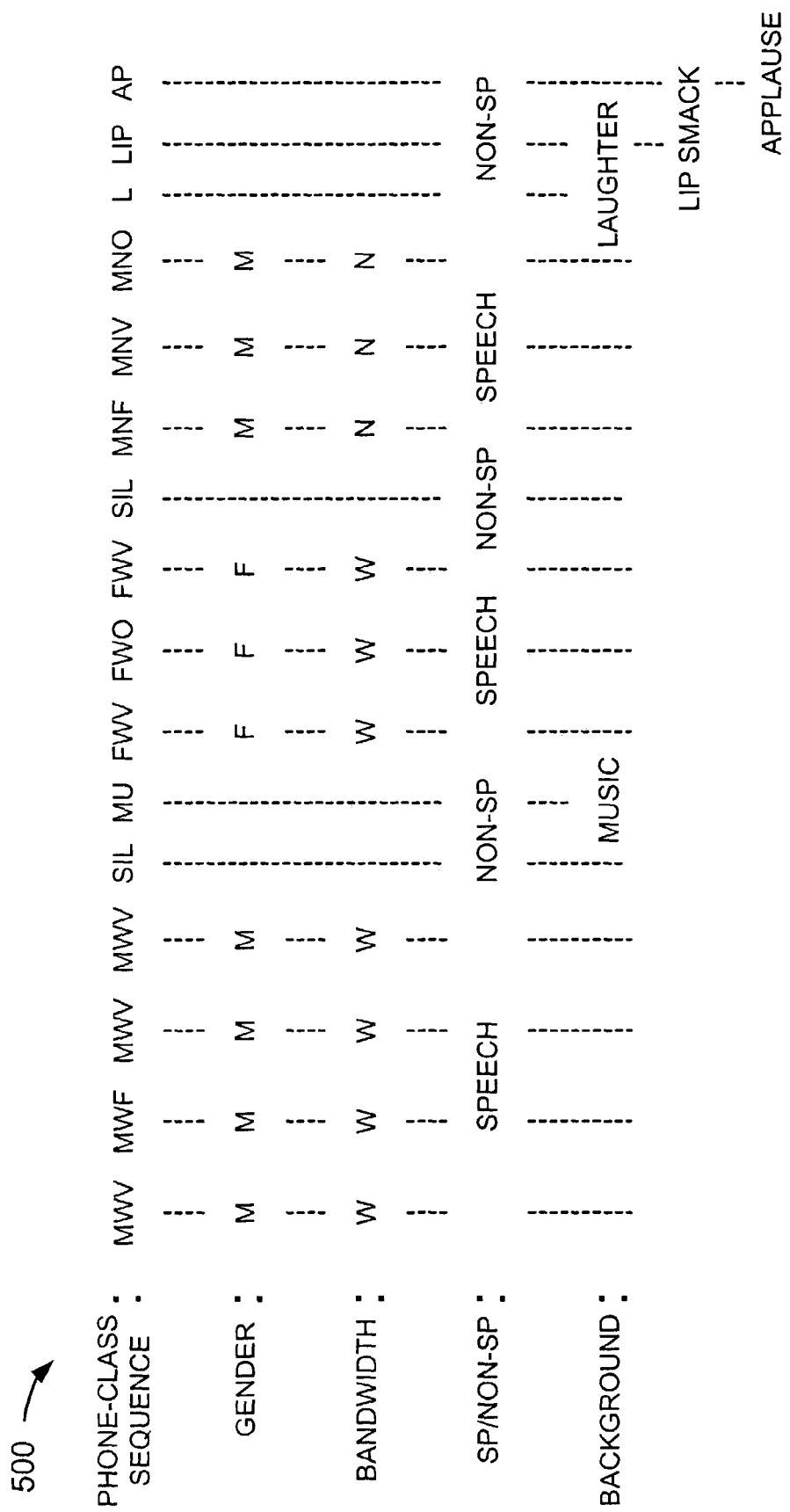
FIG. 5 illustrates an exemplary phone-class sequence that may be generated by the speech event classifier of FIG. 4.

For each phone-class, a Hidden Markov Model (HMM) is trained. Speech event classification logic 420 may then perform phone decoding to determine the phone-class sequence (or transcript). For example, suppose that audio classification logic 310 receives an audio stream that corresponds to speech from a news broadcast. FIG. 5 illustrates a phone-class sequence 500 that may be generated by speech event classification logic 420 for this example. As shown in FIG. 5, a male speaker on a wideband channel speaks first, followed by silence and music. A female speaker on a wideband channel speaks next, followed by silence. Finally, a male speaker on a narrowband channel speaks, followed by laughter, lip smack, and applause. In this case, phone-class sequence 500 may be represented by: MWV MWF MWV SIL MU FWV FWO FWV SIL MNF MNV MNO L LIP AP.

Returning to FIG. 4, speaker change detection logic 430 may use the information from speech event classification logic 420 to detect changes in speaker. Generally, speaker change detection logic 430 may hypothesize a speaker change on each phone-class boundary and perform a likelihood ratio test. If the test score is above a predetermined threshold, then speaker change detection logic 430 may determine that there is a change in speaker. One technique that may be used by speaker change detection logic 430 is described in Daben Liu et al., "Fast Speaker Change Detection for Broadcast News Transcription and Indexing," Proceedings of Eurospeech 99, Budapest, Hungary, September 1999, pp. 1031-1034, which was already incorporated herein by reference.

Bandwidth refinement logic 440 may use the information from speaker change detection logic 430 to refine the bandwidth detection result made by speech event classification logic 420. Bandwidth refinement logic 440 may take advantage of the fact that a speaker usually does not change bandwidth during his/her speech. Bandwidth refinement logic 440 may smooth the bandwidth detection results by analyzing the bandwidth results for a given speaker and using the majority result. Returning to the example of FIG. 5, suppose that speech event classification logic 420 identifies the phone-class sequence for the female speaker as FWV FNO FWV. Bandwidth refinement logic 440 may determine whether the majority of the bandwidth detection results for that speaker identifies a wideband channel or a narrowband channel. Bandwidth refinement logic 440 may select the majority bandwidth as the bandwidth used by that speaker. In this example, bandwidth refinement logic 440 would determine that the female speaker used a wideband channel.

Speaker clustering logic 450 may operate upon the results of speaker change detection logic 430 to determine whether a speaker turn belongs to some speaker who spoke before, and assign the speaker an identifier (e.g., male 3). Speaker turns may be assigned to speaker clusters, where a speaker cluster includes speaker turns corresponding to the same speaker.

Figure 6:
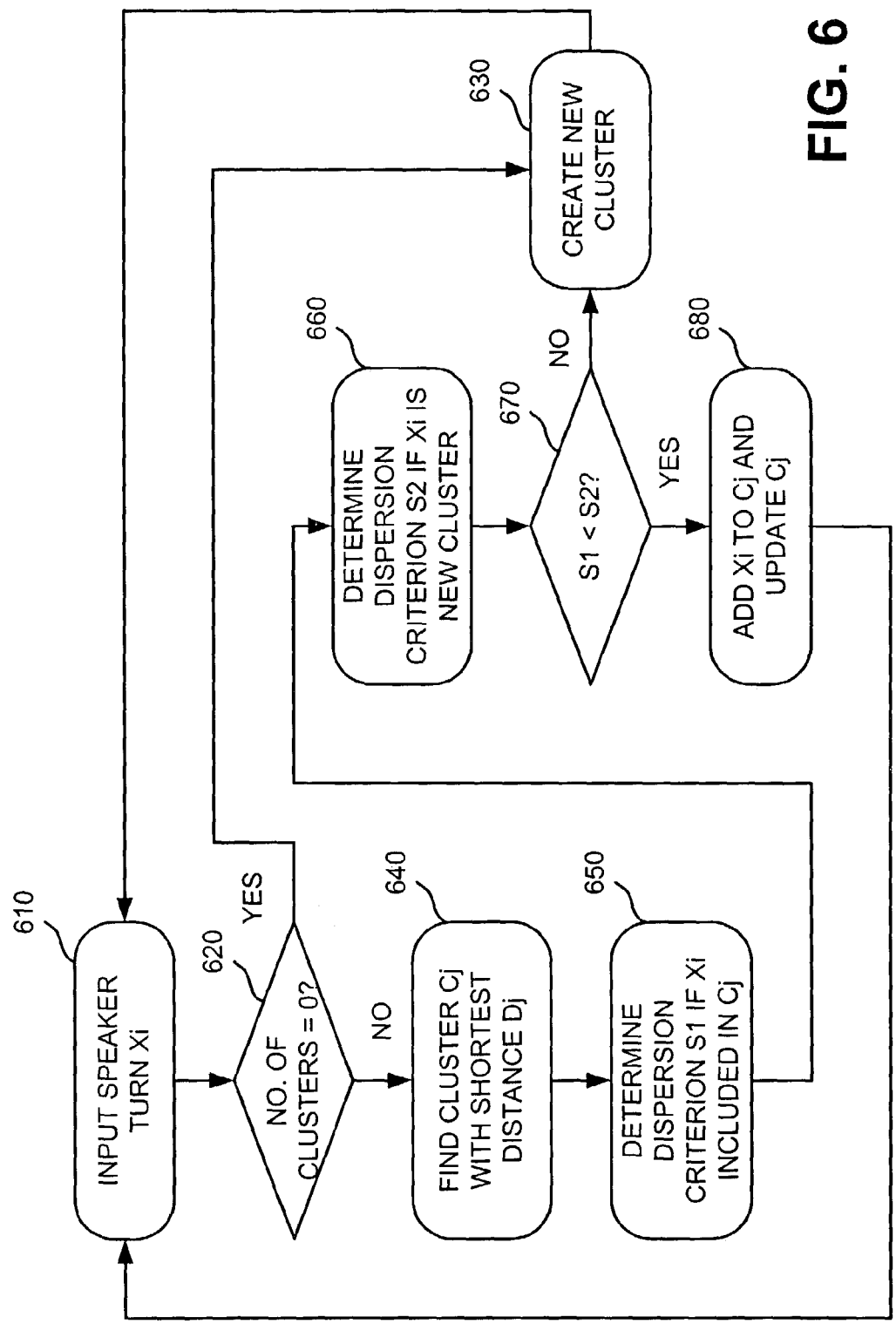
FIG. 6 is a flowchart of exemplary processing for performing speaker clustering according to an implementation consistent with the principles of the invention.

FIG. 6 is a flowchart of exemplary processing for performing speaker clustering according to an implementation consistent with the principles of the invention. Processing may begin with speaker clustering logic 450 receiving a speaker turn Xi (where i>0) from speaker change detection logic 430 (act 610).

Speaker clustering logic 450 may then determine whether any speaker clusters have been created (act 620). If no clusters exist, then speaker clustering logic 450 creates a new speaker cluster and adds the speaker turn Xi to the new speaker cluster (act 630). Processing may then return to act 610, where the next speaker turn Xi+1 is received.

If one or more speaker clusters exist, however, then speaker clustering logic 450 may find the cluster Cj with the shortest distance Dj (act 640). The shortest distance Dj may be determined using a Gaussian likelihood ratio test, such as the one described in Daben Liu et al., "Online Speaker Clustering," IEEE International Conference on Acoustics, Speech, and Signal Processing, Vol. I, 2003, pp. 572-575, which is incorporated herein by reference.

Speaker clustering logic 450 may determine the dispersion criterion S1 if the speaker turn Xi is included in the cluster Cj (act 650). The dispersion criterion can be determined as described in Daben Liu et al., "Online Speaker Clustering," IEEE International Conference on Acoustics, Speech, and Signal Processing, Vol. I, 2003, pp. 572-575, which was already incorporated herein by reference.

Speaker clustering logic 450 may also determine the dispersion criterion S2 if the speaker turn Xi is included in a new cluster (act 660). Speaker clustering logic 450 may compare the dispersion criterion S1 to the dispersion criterion S2 to determine whether S1 is less than S2 (act 670). If the dispersion criterion S1 is less than S2, then speaker clustering logic 450 may add the speaker turn Xi to cluster Cj and update cluster Cj (act 680). Processing may then return to act 610, where the next speaker turn Xi+1 is received. If the dispersion criterion S1 is not less than S2, then speaker clustering logic 450 may create a new cluster and add the speaker turn Xi to the new cluster (act 630). Processing may then return to act 610, where the next speaker turn Xi+1 is received.

Speaker clustering logic 450 may assign each of the speaker turns an identifier based on whether the speaker associated with the speaker turn corresponds to some speaker who has spoken before. For example, if a speaker turn corresponds to a new speaker, speaker clustering logic 450 may assign a unique identifier to the speaker turn. If the speaker turn corresponds to a previous speaker, however, speaker clustering logic 450 may assign the same identifier as was assigned to prior speaker turns associated with that speaker.

Returning to FIG. 4, speaker identification logic 460 determines whether the speaker within a speaker cluster identified by speaker clustering logic 450 is one of the speakers for which audio classification logic 310 has a trained model. Speaker identification logic 460 may begin by determining gender for every speaker cluster. A Gaussian mixture model for each gender may be estimated from a large sample of training data that has been partitioned by gender. Speaker identification logic 460 may then determine the gender of a speaker cluster by calculating the log likelihood ratio between the male and female models.

Speaker identification logic 460 may also identify a specific target speaker if given approximately one minute of speech from that speaker. One technique for identifying a target speaker is described in John Makhoul et al., "Speech and Language Technologies for Audio Indexing and Retrieval," Proceedings of the IEEE, Vol. 88, No. 8, August 2000, pp. 1338-1353, which is incorporated herein by reference.

Generally, this technique estimates a Gaussian mixture model from the speech of the speaker. The technique also generates a number of target models that compete with a speaker-independent model that is estimated from the speech of hundreds of speakers. Each of the target speaker models may be adapted from the speaker-independent model, resulting in robust target speaker models that are normalized to a common base. The target models may be compared to the speaker model and, based on the generated scores, one of the target models may be identified as corresponding to the speaker model.

Gender refinement logic 470 may use information from speaker change detection logic 430 to refine the gender detection results from speech event classification logic 420. Gender refinement logic 470 may take advantage of the fact that a speaker's gender does not change. Gender refinement logic 470 may smooth the gender detection results by analyzing the gender results for a given speaker and using the majority result. Returning to the example of FIG. 5, suppose that speech event classification logic 420 identifies the phone-class sequence for the female speaker as: FWV MWO FWV. Gender refinement logic 470 may determine whether the majority of the gender detection results for that speaker identifies the speaker as male or female. Gender refinement logic 470 may select the majority gender as the gender of the speaker. In this example, gender refinement logic 410 would identify the speaker as female.

Gender refinement logic 470 may also compare the selected gender to the gender identified by speaker identification logic 460. For any speaker turn for which the two genders do not agree, gender refinement logic 470 may choose the gender that has the highest confidence score. For example, the gender determined by speech event classification logic 420 and speaker identification logic 460 may be scored based on the confidence in the accuracy of their results. If necessary, gender refinement logic 470 may compare the scores and select the highest one.

Language identification logic 480 may use the phone-class sequence from speech event classification logic 420 to detect the languages used by the speakers. Language differences are typically reflected in the way phoneme sequences appear. For each language of interest, a n-gram phoneme model may be trained. The n-gram model is a commonly use language model technique used in the speech recognition community. It calculates the probability of word Wn occurring given the previous n−1 words, as represented by:

$$P(W_n|W_1 W_2 \ldots W_{n-1}).$$

The words in this case may be phone classes.

Language identification logic 480 may then determine the probability of the phone-class sequence in a speaker turn given each language model, which may be represented by:

P(phone sequence|language i).

Language identification logic 480 may then assign the language that gives the highest probability to the speaker turn.

As described above, the detection of some audio features acts upon the detection of other ones of the audio features. This leveraging of detection results saves computing power and speeds up the system. For example, speech/non-speech detection helps in discarding non-speech portions of the audio stream, thereby avoiding unnecessary confusion and speech recognition errors.

Speech recognition logic 320 uses the detection results of audio classification logic 310 to generate a rich transcription. For example, the speech/non-speech detection aids speech recognition speed and efficiency. Speech recognition logic 320 may discard the non-speech portions of the audio stream so that they are not recognized. Also, when a speaker turn is too long, speech recognition logic 320 usually needs to chop the speech into smaller utterances so that it can recognize them more efficiently. The speech/non-speech labeling allows the chopping to be done only on the non-speech part, which avoids chopping in the middle of a word.

Speaker change detection is useful for speaker-based normalization so that speech from different speakers can be more alike. This has been proven to help improve accuracy for speaker-independent recognition systems. Speaker clustering helps to group speech based on speaker, so that speech recognition logic 320 can do speaker adaptation on these clusters. This can improve recognition accuracy.

Speech recognition logic 320 may use gender information to choose gender-specific models to improve accuracy. Speech recognition logic 320 may use channel bandwidth information to choose band-specific models to also improve accuracy. Language identification can allow a multilingual recognition system, such as speech recognition logic 320, to automatically switch from models of one language to another. Language identification can also permit dialect-specific modeling if dialect is also included in language identification.

CONCLUSION

Systems and methods consistent with the present invention classify a continuous stream of audio based on different features present in the audio stream. Different models may then be used to detect the audio features with high confidence. These techniques may take advantage of the relationship among certain audio features to facilitate the detection of these features. The audio features may be used by a speech recognition system to improve its word recognition results.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts has been described with regard to the flowchart of FIG. 6, the order of the acts may differ in other implementations consistent with the principles of the invention.

Certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A speech recognition system, comprising:
audio classification logic configured to:
receive an audio stream, and
detect a plurality of audio features from the audio stream by:
decoding the audio stream to generate a phone-class sequence relating to the audio stream, and
processing the phone-class sequence to cluster speakers together, identify known ones of the speakers, and identify language used in the audio stream; and
speech recognition logic configured to recognize speech in the audio stream using the audio features.

2. The system of claim 1, wherein when decoding the audio stream, the audio classification logic is configured to:
classify the audio stream into speech and non-speech portions,
identify genders of speakers corresponding to the speech portions, and
identify channel bandwidths used by the speakers.

3. The system of claim 2, wherein when classifying the audio stream, the audio classification logic is configured to:
further classify the non-speech portions into at least two of silence, music, laughter, applause, and lip smack.

4. The system of claim 2, wherein when decoding the audio stream, the audio classification logic is further configured to:
identify speaker turns based on changes in the speakers.

5. The system of claim 2, wherein when processing the phone-class sequence, the audio classification logic is further configured to:
refine the identification of channel bandwidths by selecting a majority one of the channel bandwidths for the speakers.

6. The system of claim 2, wherein when processing the phone-class sequence, the audio classification logic is frirther configured to:
refine the identification of genders by selecting a majority one of the genders for the speakers.

7. The system of claim 1, wherein when clustering speakers together, the audio classification logic is configured to:
assign identifiers to the speakers.

8. The system of claim 7, wherein when assigning identifiers, the audio classification logic is configured to:
identify speech corresponding to one of the speakers who has spoken before, and
attach a label to the speech to identity the speech as coming from the one of the speakers.

9. The system of claim 1, wherein when identifying known ones of the speakers, the audio classification logic is configured to:
identify names of the known ones of the speakers.

10. A method for providing speech recognition, comprising:
receiving an audio signal;

detecting a plurality of audio features from the audio signal by:
   generating a phone-class sequence relating to the audio signal, and
   processing the phone-class sequence to cluster speakers together, identity known ones of the speakers, and identify language associated with the audio signal; and
recognizing speech in the audio signal using the audio features.

11. The method of claim 10, wherein the generating a phone-class sequence includes:
   classifying the audio signal into speech and non-speech portions,
   identifying genders of speakers corresponding to the speech portions, and
   identifying channel bandwidths used by the speakers.

12. The method of claim 11, wherein the classifying the audio signal includes:
   classifying the non-speech portions into at least two of silence, music, laughter, applause, and lip smack.

13. The method of claim 11, wherein the generating a phone-class sequence includes:
   identifying speaker turns based on changes in the speakers.

14. The method of claim 11, wherein the processing the phone-class sequence includes:
   refining the identification of channel bandwidths by selecting a majority one of the channel bandwidths for the speakers.

15. The method of claim 11, wherein the processing the phone-class sequence includes:
   refining the identification of genders by selecting a majority one of the genders for the speakers.

16. The method of claim 10, wherein the clustering speakers together includes:
   assigning identifiers to the speakers.

17. The method of claim 16, wherein the assigning identifiers includes:
   identifying speech corresponding to one of the speakers who has spoken before, and
   attaching a label to the speech to identify the speech as coming from the one of the speakers.

18. The method of claim 10, wherein the identifying known ones of the speakers includes:
   identifying a name of the known ones of the speakers.

19. An audio classifier, comprising:
   speech event classification logic configured to:
      receive an audio stream,
      classify the audio stream into speech and non-speech portions,
      identify genders of speakers corresponding to the speech portions, and
      identify channel bandwidths used by the speakers;
   speaker change detection logic configured to identify speaker turns based on changes in the speakers;
   speaker clustering logic configured to generate labels for the speaker turns;
   bandwidth refinement logic configured to refine the identification of channel bandwidths by the speech event classification logic;
   gender refinement logic configured to refine the identification of genders by the speech event classification logic; and
   language identification logic configured to identify one or more languages associated with the audio stream.

20. The audio classifier of claim 19, wherein when classifying the audio stream, the speech event classification logic is further configured to:
   classify the non-speech portions into at least two of silence, music, laughter, applause, and lip smack.

21. The audio classifier of claim 19, wherein when refining the identification of channel bandwidths, the bandwidth refinement logic is configured to:
   select a majority one of the channel bandwidths when more than one of the channel bandwidths was identified as used by one of the speakers.

22. The audio classifier of claim 19, wherein the speaker clustering logic is configured to:
   identify speech corresponding to one of the speakers who has spoken before, and attach a label to the speech to identify the speech as coming from the one of the speakers.

23. The audio classifier of claim 19, further comprising:
   speaker identification logic configured to identify a name of one or more of the speakers.

24. The audio classifier of claim 23, wherein the speaker identification logic is further configured to determine genders of the speakers.

25. The audio classifier of claim 24, wherein the gender refinement logic is configured to:
   determine genders of the speakers based on a comparison of the identification of genders by the speech event classification logic and the determination of genders by the speaker identification logic.

26. The audio classifier of claim 19, wherein when refining the identification, of genders, the gender refinement logic is configured to:
   select a majority one of the genders when more than one of the genders was identified as corresponding to one of the speakers.

27. The audio classifier of claim 19, wherein the language identification logic is configured to:
   generate a n-gram phoneme model, and
   use the n-gram phoneme model to identify a language used in the speaker turns.

28. An audio classifier, comprising:
   means for receiving an audio stream;
   means for classifying the audio stream into speech and non-speech portions, genders of speakers corresponding to the speech portions, and channel bandwidths used by the speakers;
   means for detecting speaker turns based on changes in the speakers;
   means for generating identifiers for the speaker turns;
   means for verifying genders of the speakers and channel bandwidths used by the speakers; and
   means for identifying one or more languages associated with the audio stream.

29. A method for detecting features of an audio signal, comprising:
   receiving an audio signal;
   classifying the audio signal into speech and non-speech portions, genders of speakers corresponding to the speech portions, and channel bandwidths used by the speakers;
   detecting speaker turns based on changes in the speakers;
   labeling the speaker turns;
   verifying genders of the speakers and channel bandwidths used by the speakers; and
   identifying one or more languages associated with the audio signal.

30. The method of claim 29, wherein the classifying the audio signal includes:
classifying the non-speech portions into at least two of silence, music, laughter, applause, and lip smack.

31. The method of claim 29, wherein the verifying channel bandwidths includes:
selecting a majority one of the channel bandwidths when more than one of the channel bandwidths was associated with one of the speakers.

32. The method of claim 29, wherein the labeling the speaker turns includes:
identifying speech corresponding to one of the speakers who has spoken before, and attaching a label to the speech to identify the speech as coming from the one of the speakers.

33. The method of claim 29, wherein the verifying genders includes:
selecting a majority one of the genders when more than one of the genders was associated with one of the speakers.

34. The method of claim 29, wherein the identifying one or more languages includes:
generating a n-gram phoneme model, and
using the n-gram phoneme model to identify a language used in the speaker turns.

35. A speech recognition system, comprising:
audio classification logic configured to:
 receive an audio signal,
 identify speech and non-speech portions of the audio signal,
 determine speaker turns based on the speech and non-speech portions of the audio signal, and
 determine one or more languages associated with the speaker turns; and
speech recognition logic configured to recognize the speech portions of the audio signal based on the speaker turns and the one or more languages.

36. A speech recognition system, comprising:
audio classification logic configured to:
 receive an audio signal,
 identify speech and non-speech portions of the audio signal,
 determine speaker turns based on the speech and non-speech portions of the audio signal,
 assign labels to the speaker turns, and
 identify known speakers associated with the speaker turns; and
speech recognition logic configured to recognize the speech portions of the audio signal based on the speaker turns, the labels, and the known speakers.

37. A method for recognizing speech, comprising:
receiving an audio signal containing speech;
determining genders of speakers associated with the speech;
determining channel bandwidths used by the speakers;
identifying speaker turns based on changes in the speakers;
refining the determination of genders by selecting a majority one of the genders when more than one of the genders was associated with one of the speaker turns; and
refining the determination of channel bandwidths by selecting a majority one of the channel bandwidths when more than one of the channel bandwidths was associated with one of the speaker turns.

\* \* \* \* \*